United States Patent
Miyazaki et al.

(10) Patent No.: US 10,917,160 B2
(45) Date of Patent: Feb. 9, 2021

(54) WIRELESS BASE STATION, AND WIRELESS COMMUNICATION METHOD

(71) Applicant: NTT DOCOMO, INC., Tokyo (JP)

(72) Inventors: Hiroyuki Miyazaki, Tokyo (JP); Satoshi Suyama, Tokyo (JP); Jun Mashino, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/486,984

(22) PCT Filed: Feb. 19, 2018

(86) PCT No.: PCT/JP2018/005662
§ 371 (c)(1),
(2) Date: Aug. 19, 2019

(87) PCT Pub. No.: WO2018/151288
PCT Pub. Date: Aug. 23, 2018

(65) Prior Publication Data
US 2020/0021352 A1 Jan. 16, 2020

(30) Foreign Application Priority Data
Feb. 20, 2017 (JP) ................. 2017-029375

(51) Int. Cl.
*H04B 7/08* (2006.01)
*H04B 7/0452* (2017.01)
(Continued)

(52) U.S. Cl.
CPC .......... *H04B 7/088* (2013.01); *H04B 7/0452* (2013.01); *H04B 7/0857* (2013.01);
(Continued)

(58) Field of Classification Search
CPC .... H04B 7/088; H04B 7/0452; H04B 7/0857; H04B 7/0862; H04B 7/0617; H04W 16/28
See application file for complete search history.

(56) References Cited

U.S. PATENT DOCUMENTS 7,321,772 B2 * 1/2008 Morimoto ............. H04W 36/22
455/422.1
7,457,641 B1 * 11/2008 Legnain ............ H04W 72/1231
455/450

(Continued)

FOREIGN PATENT DOCUMENTS

WO  2013/024942 A1  2/2013
WO  2013/191517 A1  12/2013

OTHER PUBLICATIONS

Written Opinion for corresponding International Application No. PCT/JP2018/005662, dated May 15, 2018 (11 pages).

(Continued)

*Primary Examiner* — James M Perez
(74) *Attorney, Agent, or Firm* — Osha Bergman Watanabe & Burton LLP

(57) ABSTRACT

Radio base station 10 configured to perform MIMO transmission with user terminals 20 includes: beam selecting section 100 configured to select at least one used beam from among a plurality of beams based on beam-selection reference parameters to be computed based on beam information transmitted by user terminals 20; and user terminal selecting section 102 configured to select, from among at least one of user terminals 20 which has selected the at least one used beam, at least one of user terminals 20 to be a target for the at least one used beam.

11 Claims, 12 Drawing Sheets

(51) Int. Cl.
*H04B 7/06* (2006.01)
*H04W 16/28* (2009.01)

(52) U.S. Cl.
CPC ......... *H04B 7/0862* (2013.01); *H04B 7/0617* (2013.01); *H04W 16/28* (2013.01)

(56) References Cited

U.S. PATENT DOCUMENTS

| | | | | |
|---|---|---|---|---|
| 8,275,387 | B2* | 9/2012 | Morimoto | H04W 48/20 455/453 |
| 8,385,939 | B2* | 2/2013 | Liao | H04L 5/0051 455/453 |
| 8,542,640 | B2* | 9/2013 | Ramprashad | H04W 16/10 370/329 |
| 8,588,351 | B2* | 11/2013 | Bush | H04B 1/0092 375/347 |
| 8,879,468 | B2* | 11/2014 | Benjebbour | H04B 7/0452 370/328 |
| 9,048,894 | B2* | 6/2015 | Wang | H04B 7/043 |
| 9,246,571 | B2* | 1/2016 | Wang | H04B 7/043 |
| 10,039,026 | B2* | 7/2018 | Bae | H04W 16/28 |
| 10,542,485 | B2* | 1/2020 | Obara | H04W 48/16 |
| 10,574,308 | B2* | 2/2020 | Wernersson | H04B 7/0473 |
| 10,727,917 | B2* | 7/2020 | Athley | H04B 7/0604 |
| 2003/0176192 | A1* | 9/2003 | Morimoto | H04W 48/20 455/453 |
| 2007/0060192 | A1* | 3/2007 | Morimoto | H04W 36/22 455/525 |
| 2009/0143075 | A1* | 6/2009 | Morimoto | H04W 48/20 455/452.2 |
| 2010/0130223 | A1* | 5/2010 | Liao | H04B 7/0617 455/453 |
| 2011/0039547 | A1* | 2/2011 | van Rensburg | H04W 72/1252 455/423 |
| 2012/0026955 | A1* | 2/2012 | Benjebbour | H04B 7/0452 370/329 |
| 2013/0039345 | A1* | 2/2013 | Kim | H04W 72/0413 370/332 |
| 2013/0148538 | A1* | 6/2013 | Ohwatari | H04B 7/0452 370/252 |
| 2013/0343303 | A1* | 12/2013 | Kim | H04B 7/0639 370/329 |
| 2014/0307654 | A1* | 10/2014 | Kim | H04B 7/0647 370/329 |
| 2014/0341048 | A1* | 11/2014 | Sajadieh | H04L 47/803 370/252 |
| 2015/0016379 | A1* | 1/2015 | Nam | H04B 7/0619 370/329 |
| 2016/0197709 | A1* | 7/2016 | Shen | H04L 5/0048 370/329 |
| 2016/0360536 | A1* | 12/2016 | Bae | H04W 16/28 |
| 2017/0302341 | A1* | 10/2017 | Yu | H04W 72/0446 |
| 2018/0109304 | A1* | 4/2018 | Wiberg | H04L 25/0224 |
| 2018/0269941 | A1* | 9/2018 | Faxer | H04B 7/0639 |
| 2018/0331746 | A1* | 11/2018 | Okuyama | H04W 72/046 |
| 2019/0045460 | A1* | 2/2019 | Muruganathan | H04B 7/0482 |
| 2019/0075515 | A1* | 3/2019 | Obara | H04B 7/0617 |
| 2019/0158206 | A1* | 5/2019 | Li | H04J 13/0048 |
| 2019/0222279 | A1* | 7/2019 | Xi | H04W 72/00 |
| 2019/0238282 | A1* | 8/2019 | Cao | H04W 16/02 |
| 2019/0253211 | A1* | 8/2019 | Kakishima | H04B 7/0619 |
| 2019/0319682 | A1* | 10/2019 | Zhang | H04B 7/0617 |
| 2019/0327632 | A1* | 10/2019 | Kim | H04B 7/0452 |
| 2019/0387534 | A1* | 12/2019 | Geraci | H04B 7/0452 |
| 2019/0394787 | A1* | 12/2019 | Mashino | H04W 72/1231 |
| 2020/0021350 | A1* | 1/2020 | Koskela | H04B 7/0639 |
| 2020/0021352 | A1* | 1/2020 | Miyazaki | H04B 7/088 |
| 2020/0059290 | A1* | 2/2020 | Pan | H04B 7/0882 |
| 2020/0059398 | A1* | 2/2020 | Pan | H04W 72/0413 |
| 2020/0076486 | A1* | 3/2020 | Choe | H04B 7/0695 |
| 2020/0106513 | A1* | 4/2020 | Islam | H04B 7/0695 |
| 2020/0244413 | A1* | 7/2020 | Takeda | H04B 7/0695 |

OTHER PUBLICATIONS

International Search Report for corresponding International Application No. PCT/JP2018/005662, dated May 15, 2018 (5 pages).
T. Obara et al.; "Joint Processing of Analog Fixed Beamforming and CSI-Based Precoding for Super High Bit Rate Massive MIMO Transmission Using Higher Frequency Bands," IEICE Transactions on Commununication, vol. E98-B, No. 8, pp. 1474-1481, Aug. 2015 (9 pages).
S. Yoshioka et al.; "Performance Evaluation of Massive MIMO with Digital Beamforming in Low SHF Bands for 5G"; IEICE Technical Report, vol. 115, No. 472, RCS2015-378, pp. 261-266, Mar. 2016 (6 pages).

* cited by examiner

WIRELESS BASE STATION, AND WIRELESS COMMUNICATION METHOD

TECHNICAL FIELD

The present invention relates to a radio base station and a radio communication method.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT), and the like.

In a future radio communication system (for example, 5G), the use of Massive MIMO (Multiple Input Multiple Output) using a large number of antenna elements (for example, 100 elements or more) in a high frequency band (for example, 5 GHz or higher) is studied to further increase the speed and reduce the interference in signal transmission.

Examples of techniques of controlling beams or streams in MIMO include a method of combining digital precoding, analog fixed beamforming (BF), and channel status information (CSI) (for example, see Non-Patent Literature (hereinafter referred to as "NPL") 1). The examples also include a method of combining digital precoding, digital fixed BF, and CSI (for example, see NPL 2).

Moreover, a technique of multiplexing multiple streams by multiple-streams distribution among multiple user terminals has been well known.

CITATION LIST

Non-Patent Literature

NPL 1
T. Obara, S. Suyama, J. Shen, and Y. Okumura, "Joint processing of analog fixed beamforming and CSI-based precoding for super high bit rate Massive MIMO transmission using higher frequency bands," IEICE Trans. Commun., vol. E98-B, No. 8, pp. 1474-1481, August 2015.

NPL 2
Shohei Yoshioka, Tatsuki Okuyama, Satoshi Suyama, and Yukihiko Okumura "Performance Evaluation of Massive MIMO with Digital Beamforming in Low SHF Bands for 5G," IEICE Tech. Rep., vol. 115, No. 472, RCS2015-378, pp. 261-266, March 2016.

SUMMARY OF INVENTION

Technical Problem

However, in MU-MIMO, when the channel spatial correlation among connected user terminals during the same period is high, the streams for the user terminals interfere with one another, so that the throughput of the entire radio communication system decreases.

In one aspect of the present invention, a radio base station and radio communication method making it possible to appropriately select user terminals to be connected during the same period in MU-MIMO are provided.

Solution to Problem

A radio base station configured to perform MIMO transmission with user terminals, according to one aspect of the present invention includes: a beam selecting section configured to compute beam-selection reference parameters based on beam information transmitted by the user terminals, the beam selecting section being configured to select at least one used beam from among a plurality of beams based on the beam-selection reference parameters; and a user terminal selecting section configured to select, from among at least one of the user terminals which has selected the at least one used beam, at least one of the user terminals to be a target for the at least one used beam.

Advantageous Effects of Invention

According to one aspect of the present invention, user terminals to be connected during the same period in MU-MIMO can be selected appropriately.

DESCRIPTION OF EMBODIMENTS

Hereinafter, embodiments of the present invention will be described in detail with reference to the accompanying drawings.

Note that, reference signs, as in "user terminal 20A" and "user terminal 20B," may be used for describing elements of the same kind while distinguishing them from each other, and only common numbers of the reference signs, as in "user terminals 20," may be used for describing elements of the same kind without distinguishing them from each other.

Note also that, unless specifically stated otherwise or considered as theoretically clearly indispensable, constituent elements (including element step) in the following embodiment of the present invention are not necessarily indispensable.

Hereinafter, descriptions are given in relation to the case where Multi-User MIMO (MU-MIMO) transmission in which streams are transmitted to multiple user terminals while being multiplexed by stream distribution among the multiple user terminals is performed. In addition, hereinafter, the descriptions are also given in relation to the case where beam forming (BF) is performed in Massive MIMO.

<Configuration of Radio Base Station>

Figure 1:
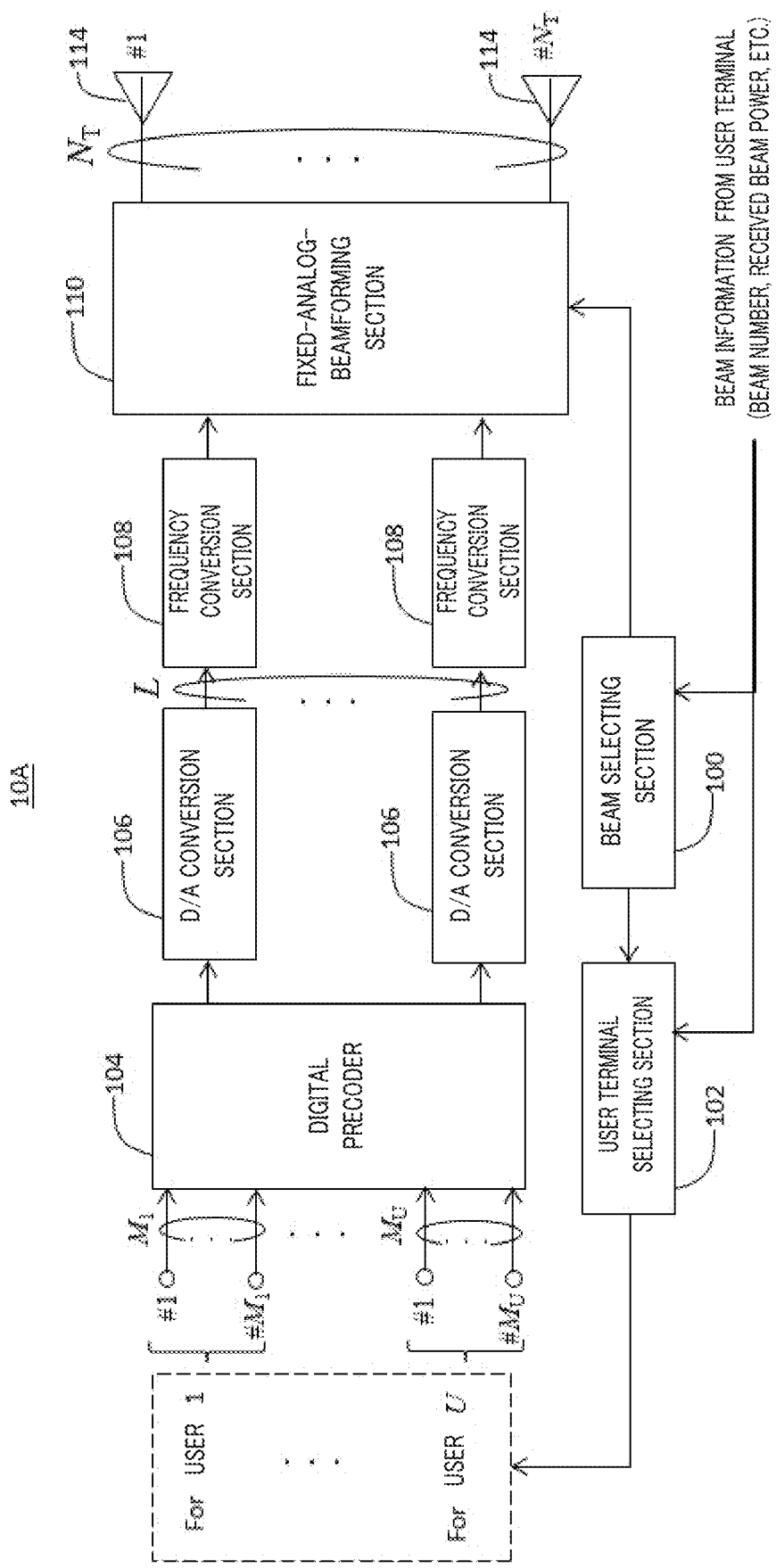
FIG. 1 is a block diagram illustrating a configuration of a radio base station configured to perform MU-MIMO according to an embodiment of the present invention.

FIG. 1 is a block diagram illustrating a configuration of a radio base station configured to perform MU-MIMO.

In FIG. 1, radio base station (hereinafter referred to as "base station") 10A includes beam selecting section 100, user terminal selecting section (hereinafter referred to as "terminal selecting section") 102, digital precoder 104, D/A conversion sections 106, frequency conversion sections 108, fixed-analog-beamforming section 110, and multiple antennas 114.

Base station 10 performs MIMO transmission by selecting L fixed beams from among multiple fixed beams and by selecting U terminals from among multiple user terminals (hereinafter referred to as "terminals"). "L" and "U" each denote an integer equal to or greater than one. The transmission directions (angles) of the multiple fixed beams are each fixed. Hereinafter, a fixed beam may also be simply referred to as "beam."

Base station 10 uses M streams for a terminal. M is an integer equal to or greater than one, where "M<L" holds true.

Beam selecting section 100 selects beams to be used for data transmission to terminals (hereinafter referred to as "used beams") from among multiple beams in different directions. Beam selecting section 100 controls fixed-analog-beamforming section 110 in order to transmit the selected used beams.

For example, beam selecting section 100 computes beam-selection reference parameters based on beam information that is transmitted by the terminals and that includes the received power of each beam, beam numbers, and the like, and beam selecting section 100 selects the used beams from among multiple beams based on the beam-selection reference parameters. Note that the details of the method for computing the beam-selection reference parameters are described later.

After below-mentioned terminal selecting section 102 selects target terminals to which the used beams are to be transmitted (referred to as "target terminals"), beam selecting section 100 may reselect used beams from among the multiple beams based on beam-selection reference parameters to be computed from the beam information on beams selected by the selected target terminals.

Terminal selecting section 102 selects the target terminals for the used beams from among those terminals which had selected beams that are to be selected as the used beams by beam selecting section 100. Terminal selecting section 102 controls such that data which can be received by the target terminals are input to digital precoder 104.

For example, terminal selecting section 102 computes terminal-selection reference parameters based on the beam information including the beam numbers, the received power of each beam, and the like transmitted by the terminals which had selected beams that are to be selected as the used beams by beam selecting section 100, and terminal selecting section 102 selects the target terminals for the used beams based on the terminal-selection reference parameters. Note that the details of the method for computing the terminal-selection reference parameters are described later.

Terminal selecting section 102 may select provisional terminals based on the user-terminal-selection reference parameters, and may select the target terminals for the used beams based on CSI of the selected provisional terminals.

Digital precoder 104 multiplies signals, which are a signal before being transmitted, by weights depending on radio propagation paths in advance in order to improve the reception quality of terminals. Digital precoder 104 generates L sequences of signals by applying precoding matrix P to M sequences of baseband signals and outputs the L sequences of signals. "L" denotes the number of beams to be transmitted. Here, precoding matrix P includes sequences of L rows and M columns.

The L sequences of signals output by digital precoder 104 are respectively converted from digital to analog by D/A conversion sections 106, the frequencies of the L sequences of signals are respectively upconverted by frequency conversion sections 108, and the L sequences of signals are input to fixed-analog-beamforming section 110.

Fixed-analog-beamforming section 110 applies beamforming matrices $W_T$ corresponding to the used beams selected by beam selecting section 100 to the L sequences of input signals, so as to generate $N_T$ sequences of signals. "$N_T$" denotes the number of transmit antenna elements. Here, beamforming matrices $W_T$ each include $N_T$ rows and L columns. The $N_T$ sequences of multiple signals are transmitted respectively from multiple antennas 114.

<Modification of Radio Base Station>

Figure 2:
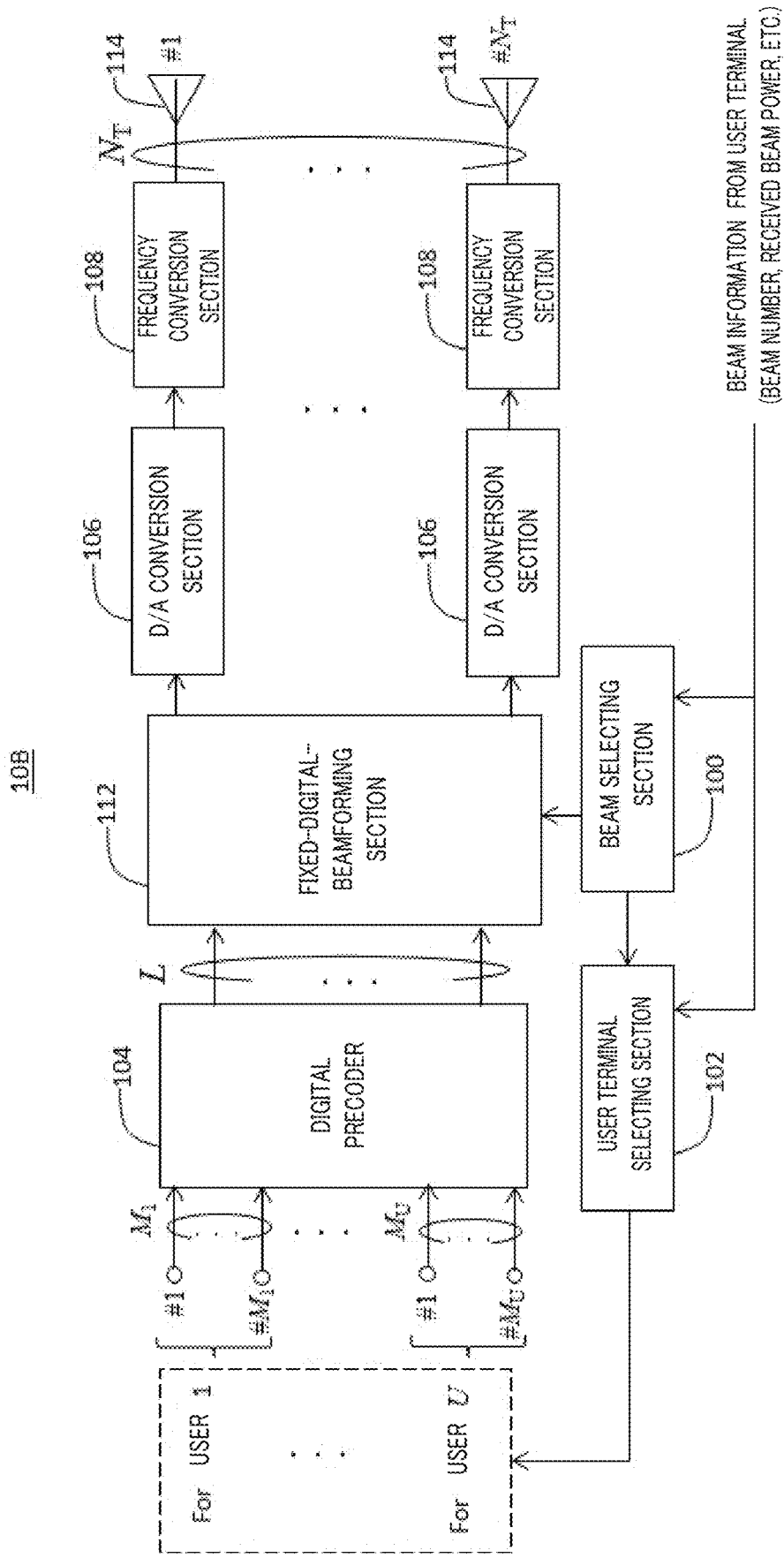
FIG. 2 is a block diagram illustrating a modified configuration of the radio base station configured to perform MU-MIMO according to the embodiment of the present invention.

FIG. 2 is a block diagram illustrating a modified base station configured to perform MU-MIMO.

In base station 10A illustrated in FIG. 1, fixed-analog-beamforming section 110 is disposed after frequency conversion sections 108. In contrast, in base station 10B illustrated in FIG. 2, fixed-digital-beamforming section 112 is disposed after digital precoder 104. FIGS. 1 and 2 differ in this point.

Beam selecting section 100 selects used beams to be used for data transmission to terminals from among multiple beams in different directions. Beam selecting section 100 controls fixed-digital-beamforming section 112 in order to transmit the selected used beams. Fixed-digital-beamforming section 112 applies beamforming matrices $W_T$ corresponding to the used beams selected by beam selecting section 100 to L sequences of signals input from digital precoder 104, so as to generate and output $N_T$ sequences of signals.

The $N_T$ sequences of signals output from fixed-digital-beamforming section 112 are respectively converted from digital to analog by D/A conversion sections 106, the frequencies of the $N_T$ sequences of signals are respectively upconverted in frequency conversion sections 108, and the $N_T$ sequences of signals are transmit from antennas 114.

<Operation>

Figure 3:
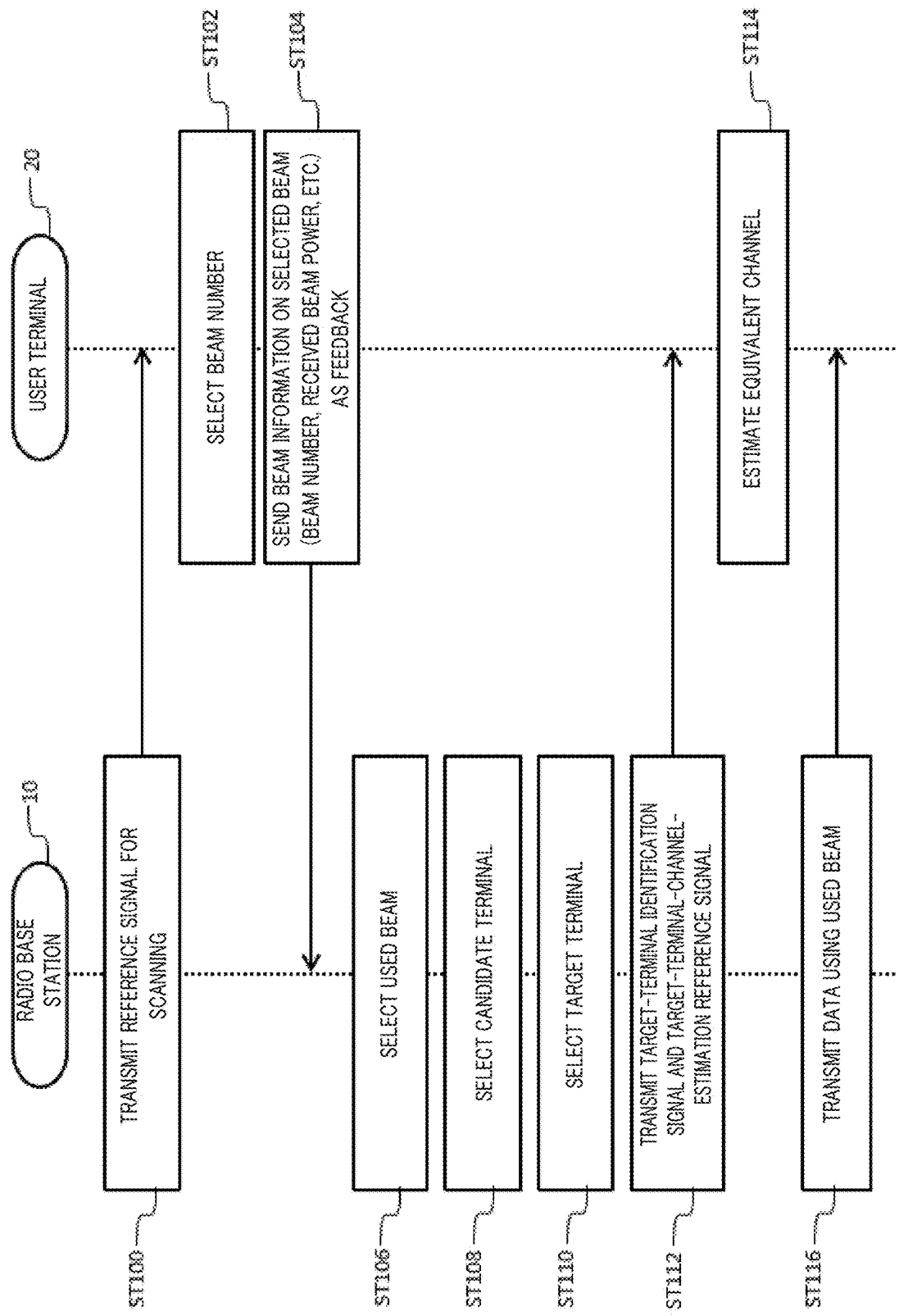
FIG. 3 is a sequence chart illustrating processing to select target terminals based on used beams according to the embodiment of the present invention.
Figure 4:
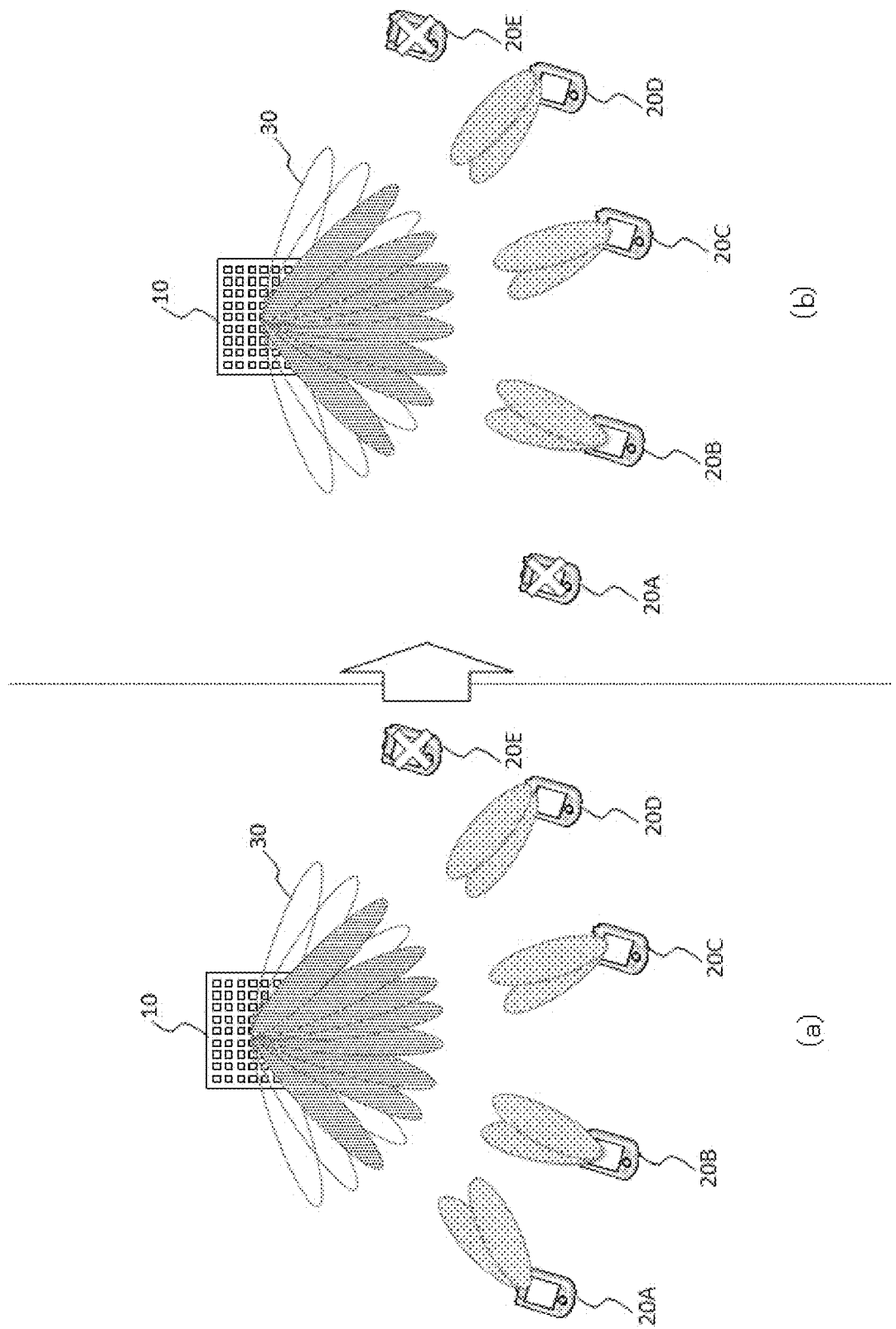
FIG. 4 schematically illustrates an operation to select the target terminals based on the used beams according to the embodiment of the present invention.

FIG. 3 is a sequence chart illustrating processing to select target terminals 20 based on used beams. FIG. 4 schematically illustrates an operation in a radio communication system in the processing illustrated in FIG. 3.

Base station 10 controls beamforming section 110 (or 112) to successively transmit beams 30 in different directions (angles) that include reference signals for scanning (ST100).

Terminals 20 each receive beams 30 transmitted successively in ST100, arrange the numbers of received multiple beams 30 (hereinafter referred to as "beam number") in descending order of received power, and select those of the beam numbers placed in the first to N-th ranks ("N" denotes a predetermined integer equal to or greater than one) (ST102).

Next, terminals 20 each transmit the beam information including the beam numbers selected in ST102, the received power levels corresponding to the beam numbers, and the like (send feedback) to base station 10 (ST104).

Base station 10 (beam selecting section 100) computes the beam-selection reference parameters based on the beam information transmitted in ST104. Then, base station 10 selects the used beams from among multiple beams 30 based on the computed beam-selection reference parameters (ST106). In FIG. 4, the used beams are represented by shading.

Base station 10 (terminal selecting section 102) selects, as candidate terminals 20, those terminals which, in ST104, have sent as feedback the numbers of the used beams selected in ST106 (ST108). For example, as illustrated at (a) in FIG. 4, terminals 20A, 20B, 20C, and 20D are selected as the candidate terminals.

Base station 10 (terminal selecting section 102) computes the terminal-selection reference parameters for the multiple candidate terminals selected in ST108. Then, base station 10 (terminal selecting section 102) selects target terminals to which the used beams are to be transmitted (simply referred to as "target terminals") from among the multiple candidate terminals based on the computed terminal-selection reference parameters (ST110). For example, as illustrated at (b) in FIG. 4, terminals 20B, 20C, and 20D are selected as the target terminals.

Base station 10 transmits target-terminal identification signals, which are identification signals of the target terminals, and target-terminal-channel-estimation reference signals, which are reference signals for estimating weighted equivalent channels for the target terminals (ST112). These signals may be transmitted by the used beams selected in ST106.

The terminals corresponding to the target-terminal identification signals (that is, target terminals) estimate the weighted equivalent channels based on the target-terminal-channel-estimation reference signals (ST114).

Base station 10 transmits data to the target terminals using the used beams (ST116). The target terminals receive the data on the used beams using the equivalent channels estimated in ST114.

<Beam-Selection Reference Parameter>

Next, the method for computing the beam-selection reference parameters is described.

The beam-selection reference parameters concerning the processing in above ST106 may be the total received power, as expressed in following Equation 1.

[1]
$$\rho_B(l') = \sum_{u=1}^{N_U} P_{r,u}(l')\alpha_u(l') \quad \text{(Equation 1)}$$

Here, "l" denotes a beam number, "$N_U$" denotes the number of terminals, "$P_{r,u}(1)$" denotes the received power of the 1-th beam received by the u-th terminal, and "$\alpha_u(1)$" denotes a factor that is "1" when the u-th terminal selects the 1-th beam in the processing in above ST102 or "0" when the u-th terminal does not select the 1-th beam.

Alternatively, the beam-selection reference parameters may also be the maximum received power, as expressed in following Equation 2.

[2]
$$l = \arg\max_{l'} \rho_B(l') \quad \text{(Equation 2)}$$

Alternatively, the beam-selection reference parameters may also be the total received Signal-to-Interference Ratios (SIRs), as expressed in following Equation 3.

[3]
$$\rho_B(l') = \sum_{u=1}^{N_U} \frac{P_{r,u}(l')\alpha_u(l')}{\left(\sum_{\substack{u'=1 \\ \neq u}}^{N_U} P_{r,u'}(l')\alpha_{u'}(l')\right)} \quad \text{(Equation 3)}$$

Alternatively, the beam-selection reference parameters may also be the maximum received SIRS, as expressed in following Equation 4.

[4]
$$\rho_B(l') = \max_{u=1,\ldots,N_U} \frac{P_{r,u}(l')\alpha_u(l')}{\left(\sum_{\substack{u'=1 \\ \neq u}}^{N_U} P_{r,u'}(l')\alpha_{u'}(l')\right)} \quad \text{(Equation 4)}$$

Beam selecting section 100 computes the beam-selection reference parameters by Equation 1 when the maximum total-received-power criterion is used for the beam-selection reference parameters. Beam selecting section 100 computes the beam-selection reference parameters by Equation 2 when the maximum maximum-received-power criterion is used for the beam-selection reference parameters. Beam selecting section 100 computes the beam-selection reference parameters by Equation 3 when the maximum total-received-SIR criterion is used for the beam-selection reference parameters. Beam selecting section 100 computes the beam-selection reference parameters by Equation 4 when the maximum maximum-received-SIR criterion is used for the beam-selection reference parameters. Then, beam selecting section 100 selects a predetermined number of beam numbers 1 in descending order of beam-selection reference parameter according to following Equation 5.

[5]
$$l = \arg\max_{l'} \rho_B(l') \quad \text{(Equation 5)}$$

Note that, terminals 20 may also send, as feedback, past throughput information collectively to base station 10 in the processing in above ST104 and beam selecting section 100 of base station 10 may compute the beam-selection reference parameters based on the proportional fairness (PF) criterion and select the used beams in the processing in above ST106.

Note also that, base station 10 does not need to compute beam-selection reference parameters for all subcarriers when the OFDM transmission is used. Base station 10 may compute beam-selection reference parameters in consideration of one or more of the subcarriers and may select used beams based on the computed result.

<Terminal-Selection Reference Parameters>

Next, the method for computing the terminal-selection reference parameters is described.

The terminal-selection reference parameters concerning the processing in above ST110 may be the total received power, as expressed in following Equation 6.

[6]
$$\rho_U(u) = \sum_{l \in B} P_{r,u}(l) \quad \text{(Equation 6)}$$

Here, "B" denotes a set of the numbers of used beams selected by base station 10 in the processing in above ST106.

When the aforementioned total received power is used for the terminal-selection reference parameters, terminal selecting section 102 selects, as target terminals, a predetermined number of terminals in descending order of total received power computed by Equation 5.

Alternatively, the terminal-selection reference parameters may also be interbeam interference factors, as expressed in following Equation 7.

$$\rho_U(u) = tr(H_{u \to \tilde{U}} H_{\tilde{U} \to u}) \quad \text{(Equation 7)}$$

In Equation 7, the following equations hold true.

$$H_{u \to \tilde{U}} = [H_{u \to 1} \ldots H_{u \to u-1} H_{u \to u+1} \ldots H_{u \to \tilde{N}_U}]$$

$$H_{\tilde{U} \to u} = [H_{1 \to u}^T \ldots H_{u-1 \to u}^T H_{u+1 \to u}^T \ldots H_{\tilde{U}_U \to u}^T]^T$$

$$H_{u \to u'}(n,m) = P_{r,u}(\beta_u(n)) \times \eta(\beta_n(n), \beta_u(m)) \quad \text{(Equation 8)}$$

Note that, "$A^T$" denotes a transposed matrix of matrix A. Note also that, "$\tilde{U}$" denotes a set of candidate terminals other than the u-th terminal, "$N^{\tilde{U}}$" denotes the number of candidate terminals, "$H_{u \to u'}$" denotes an interference matrix between the used beams for the u-th terminal and the used beams for the u'-th terminal, "$H_{u \to u'}(n, m)$" denotes an element at the n-th row and m-th column of the interference matrix, "$\eta(l, l')$" denotes a mutual factor between the l-th beam and the l'-the beam, and "$\beta_u(n)$" denotes the number of the n-th used beam for the u-th terminal.

When the aforementioned interbeam interference factors are used for the terminal-selection reference parameters, terminal selecting section 102 selects, as target terminals, a predetermined number of terminals in ascending order of interbeam interference factor computed by Equation 7 (i.e., in order from a lower-interference-level terminal to a higher-interference-level terminal).

Note that, terminal selecting section 102 may select target terminals using both of aforementioned Equations 6 and 7 in the processing in above ST110. For example, terminal selecting section 102 selects, as target terminals, a predetermined number of terminals in descending order of total received power and in ascending order of interbeam interference factor.

Moreover, mutual factor $\eta(l, l')$ between beams may be designed based, for example, on the beam patterns of beams 30 or on the angular differences between beams.

Alternatively, all received power $P_{r,u}(l)$ at terminals 20 may be assumed as a fixed value, such as "1" or a predetermined real number, to compute the interbeam interference factors.

Terminals 20 may also send, as feedback, past throughput information collectively to base station 10 in the processing in above ST104 and base station 10 may select the target terminals based on the proportional fairness (PF) criterion in the processing in above ST110.

Base station 10 does not need to compute terminal-selection reference parameters for all subcarriers when the OFDM transmission is used. Base station 10 may compute terminal-selection reference parameters in consideration of one or more of the subcarriers and may select target terminals based on the computed result.

Base station 10 may also compute terminal-selection reference parameters for all combinations of selecting $N\hat{}_U$ target terminals from among $N^{\tilde{U}}$ candidate terminals and may select $N\hat{}_U$ target terminals based on the computed result at once. This method is called a full search method.

Alternatively, base station 10 may also select one terminal from among terminals which have not yet been selected and compute terminal-selection reference parameters after the selected terminal is added to a set of already selected terminals. Base station 10 may select $N\hat{}_U$ target terminals by repeating this computation processing. This method is called a sequential method.

<Design Example of Interbeam Interference Factor>

Next, a design example of the interbeam interference factors is described.

Figure 5:
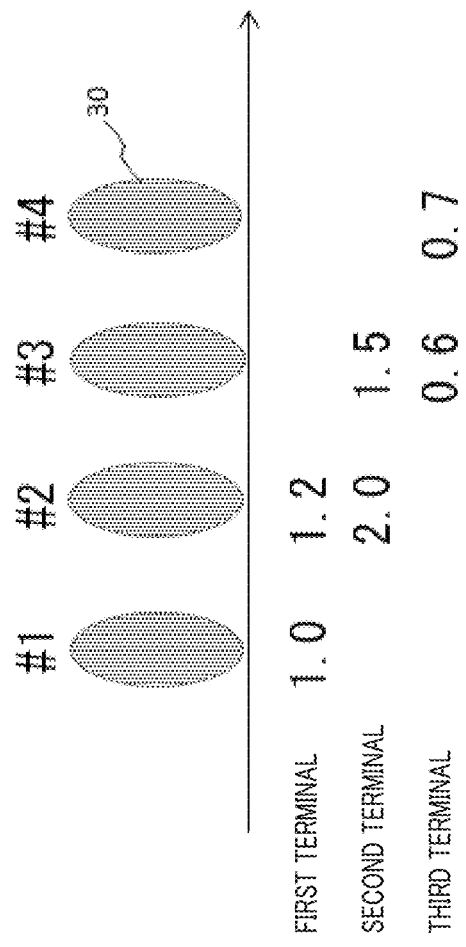
FIG. 5 is an explanatory view of a design example of interbeam interference factors in a case where the number of beams is four and the number of terminals is three.

FIG. 5 is an explanatory view of the design example of interbeam interference factors in a case where the number of beams is four and the number of terminals is three.

FIG. 5 illustrates that the below-mentioned feedback information of (A1) to (A3) is sent to base station 10 by terminals 20 in ST104.

(A1) Beam numbers "#1" and "#2" selected in ST102 and received power of "1.0" and "1.2" respectively corresponding to these beam numbers are sent as feedback by the first terminal.

(A2) Beam numbers "#2" and "#3" selected in ST102 and received power of "2.0" and "1.5" respectively corresponding to these beam numbers are sent as feedback by the second terminal sent.

(A3) Beam numbers "#2" and "#3" selected in ST102 and received power of "0.6" and "0.7" respectively corresponding to these beam numbers are sent as feedback by the third terminal.

Here, by way of example, the mutual factor between the n-th beam and the m-th beam is $\eta(n, m) = 0.5|n-m|$. In this case, a beam interference matrix of the first terminal interfering with the second and the third terminals may be expressed by following Equation 9.

[9]
$$H_{1\to 2,3} = \begin{bmatrix} 1.0 \times 0.5 & 1.0 \times 0.25 & 1.0 \times 0.25 & 1.0 \times 0.125 \\ 1.2 \times 1.0 & 1.2 \times 0.5 & 1.2 \times 0.5 & 1.2 \times 0.25 \end{bmatrix} \quad \text{(Equation 9)}$$
$$\begin{bmatrix} 0.5 & 0.25 & 0.25 & 0.125 \\ 1.2 & 0.6 & 0.6 & 0.3 \end{bmatrix}$$

In Equation 9, the first and the second columns indicate effects by the beams having beam numbers "#1" and "#2" selected by the first terminal on the beams having beam numbers "#2" and "#3" selected by the second terminal. In addition, the third and the fourth columns indicate effects by the beams having beam numbers "#1" and "#2" selected by the first terminal on the beams having beam numbers "#3" and "#4" selected by the third terminal. The interbeam interference factors may be designed in this way. However, the aforementioned design is a mere example in every respect, and is not actually limited to this design.

<Modification 1>

Figure 6:
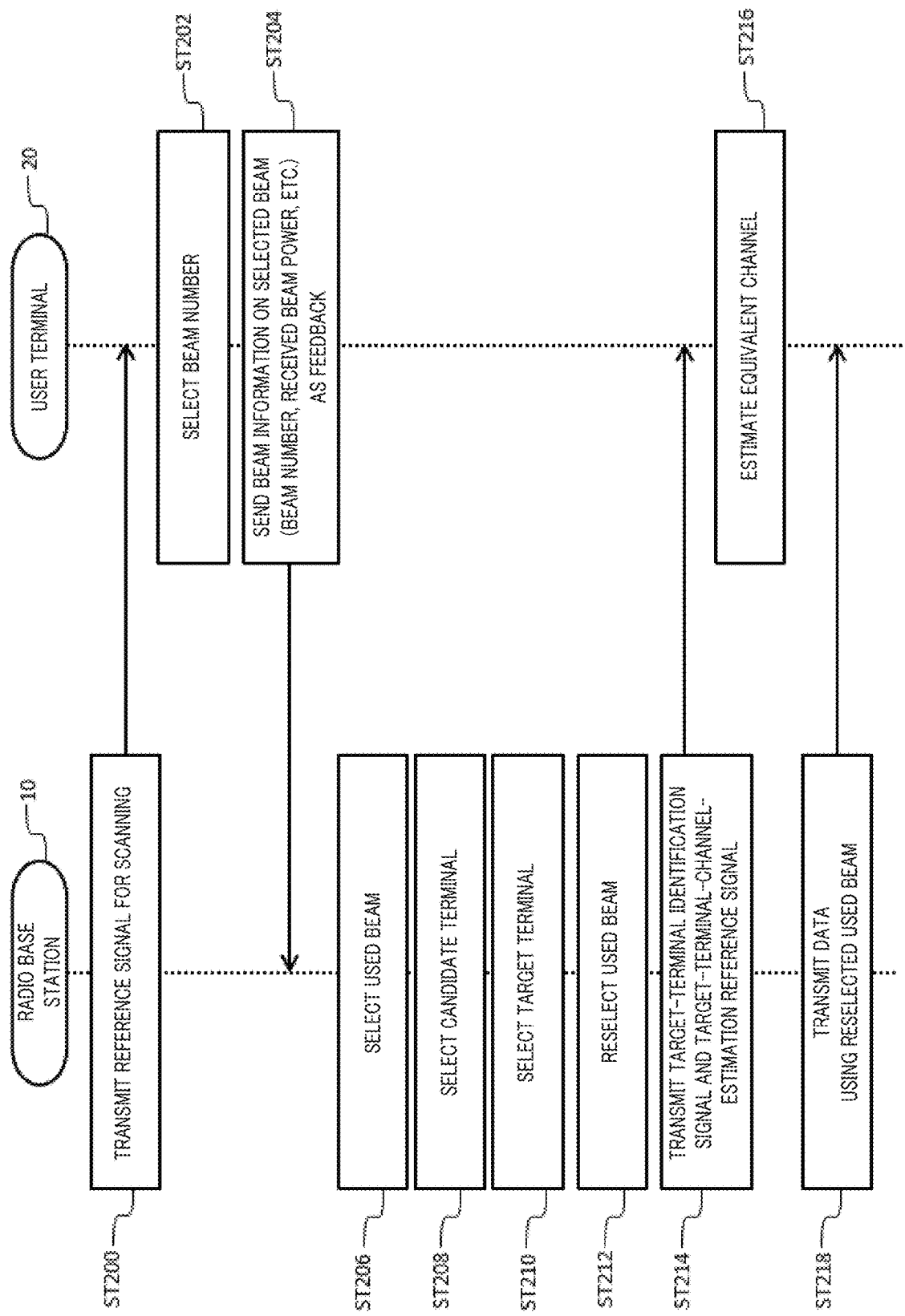
FIG. 6 is a sequence chart illustrating processing to reselect used beams after the target terminals are selected according to the embodiment of the present invention.
Figure 7:
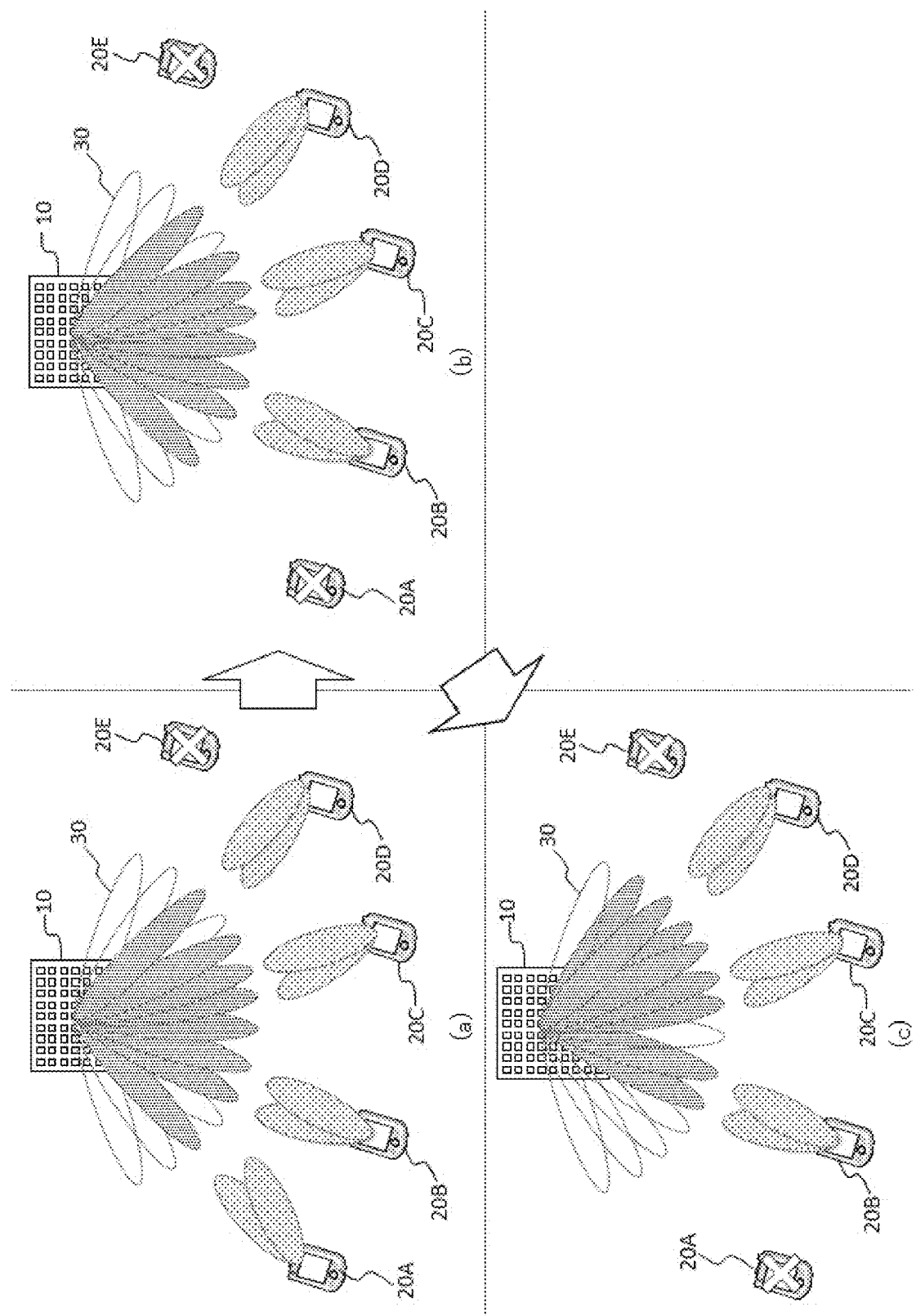
FIG. 7 schematically illustrates an operation to reselect the used beams after the target terminals are selected according to the embodiment of the present invention.

FIG. 6 is a sequence chart illustrating processing to reselect used beams after target terminals are selected. FIG. 7 schematically illustrates an operation in a radio communication system in the processing illustrated in FIG. 6.

Base station 10 and terminals 20 perform, in ST200 to ST210, the same processing as in above ST100 to ST110 in FIG. 3.

Next, beam selecting section 100 of base station 10 reselects used beams in consideration only of the target terminals (ST212). For example, as illustrated at (b) in FIG. 7, beam selecting section 100 recomputes beam-selection reference parameters in consideration only of target terminals 20B, 20C, and 20D, and reselects used beams from among the multiple beams based on the recomputed result. FIG. 7 illustrates, at (b), the used beams before reselection, and FIG. 7 illustrates, at (c), the used beams after reselection.

Terminal selecting section 102 of base station 10 transmits target-terminal identification signals and target-terminal-channel-estimation reference signals weighted according to the used beams reselected in ST212 (ST214). These signals may also be transmitted by reselected used beams 30.

The terminals corresponding to the target-terminal identification signals (that is, target terminals) estimate the weighted equivalent channels based on the aforementioned target-terminal-channel-estimation reference signals (ST216).

Base station 10 transmits data to the target terminals using the reselected used beams (ST218). The target terminals receive the data on the reselected used beams using the equivalent channels estimated in ST216.

<Modification 2>

Figure 8:
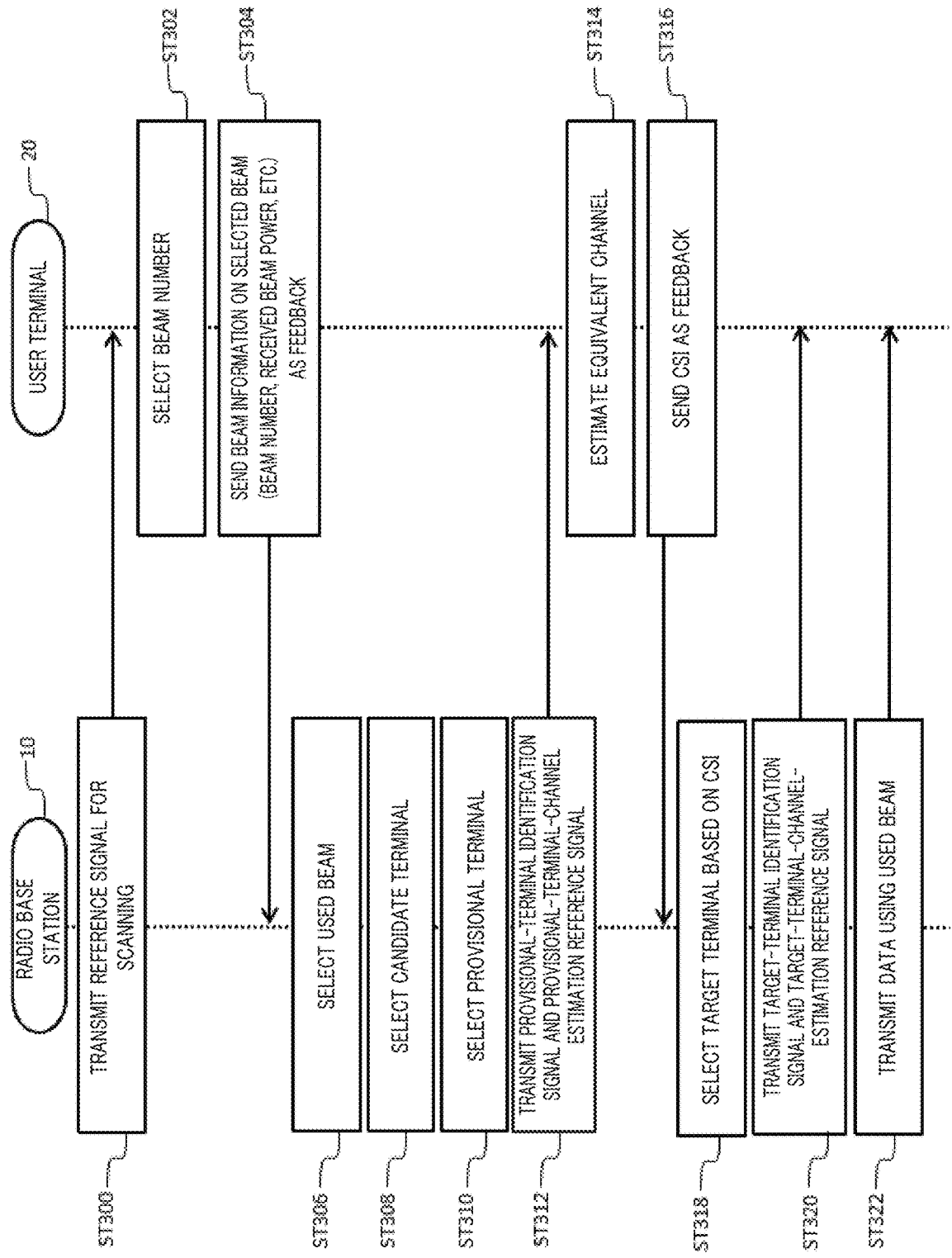
FIG. 8 is a sequence chart illustrating processing to select target terminals based on CSI according to the embodiment of the present invention.
Figure 9:
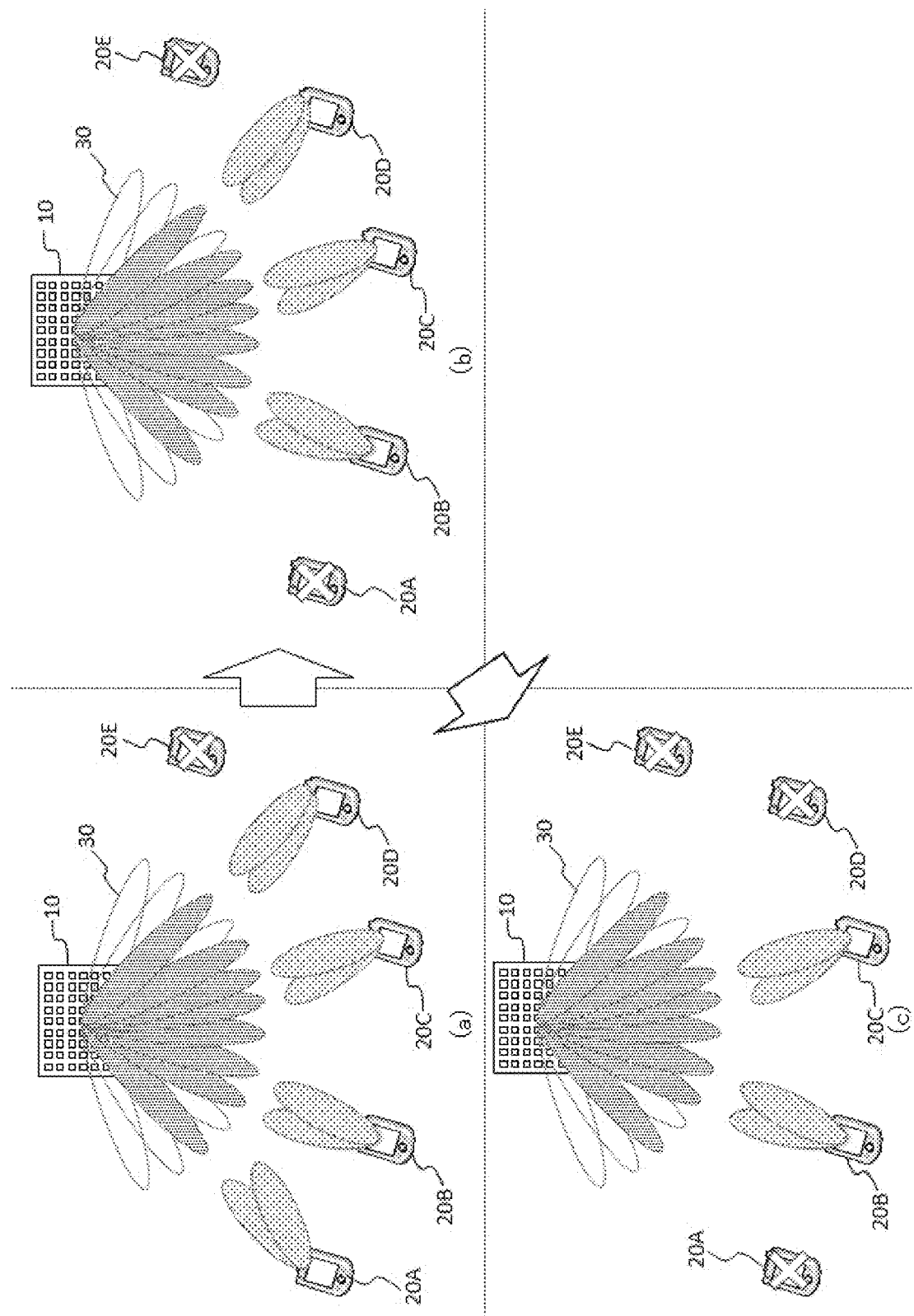
FIG. 9 schematically illustrates an operation to select the target terminals based on the CSI according to the embodiment of the present invention.

FIG. 8 is a sequence chart illustrating processing to select target terminals based on CSI. FIG. 9 schematically illustrates an operation in a radio communication system in the processing illustrated in FIG. 8.

Base station 10 and terminals 20 perform, in ST300 to ST308, the same processing as in above ST100 to ST110 in FIG. 3.

Next, terminal selecting section 102 of base station 10 computes terminal-selection reference parameters respectively for the multiple candidate terminals selected in ST308. Then, terminal selecting section 102 of base station 10 selects provisional terminals to which beams 30 are to be transmitted, from among the multiple candidate terminals based on the computed terminal-selection reference parameters (ST310). For example, terminal selecting section 102 selects terminals 20B, 20C, and 20D as the provisional terminals, as illustrated at (b) in FIG. 9.

Terminal selecting section 102 of base station 10 transmits provisional-terminal identification signals, which are identification signals of the provisional terminals, and provisional-terminal-channel-estimation reference signals, which are reference signals for estimating weighted equivalent channels for the provisional terminals (ST312). These signals may be transmitted by the used beams selected in ST306.

The terminals corresponding to the provisional-terminal identification signals (that is, provisional terminals) estimate the weighted equivalent channels based on the provisional-terminal-channel-estimation reference signals (ST314).

The provisional terminals transmit the CSI (as feedback) to base station 10 (ST316).

Terminal selecting section 102 of base station 10 selects the terminals (target terminals) to which the used beams are to be transmitted, from among the provisional terminals based on the received CSI (ST318). For example, terminal selecting section 102 selects terminals 20B and 20C as the target terminals, as illustrated at (c) in FIG. 9.

Terminal selecting section 102 of base station 10 transmits the target-terminal identification signals of the target terminals and the target-terminal-channel-estimation reference signal of the target terminals (ST320).

Base station 10 transmits data to the target terminals using the used beams (ST322). The target terminals receive the data on the used beams using the equivalent channels estimated in ST314.

Note that, determining the target terminals based on the CSI in ST318 may be done by the Max-C/I criterion, PF criterion, maximum Chordal-Distance criterion, or the like.

Note also that, selecting the provisional terminals in ST310 and selecting the target terminals in ST318 do not necessarily have to be done in a series of processing (in the same cycle). For example, the cycle of selecting the target terminals in ST318 may be shorter than that of selecting the provisional terminals in ST310 or, in contrast, the cycle of selecting the target terminals in ST318 may be longer than that of selecting the provisional terminals in ST310.

In addition, when the aforementioned method for selecting terminals 20 is applied to OFDM transmission, the terminals do not necessarily have to be selected in consideration of all subcarriers. For example, the terminals may be selected in consideration of one or more of the subcarriers.

Moreover, the above-mentioned full search method or sequential method may be used as the method for selecting terminals 20 based on the CSI.

When terminals 20 are to be selected based on the CSI, terminal number selection may be introduced. In the terminal number selection, terminal total throughputs respectively achievable using different numbers of selected terminals are computed, and a combination of the number of terminals and the terminals by which the highest terminal total throughput is achievable is employed.

<Modification 3>

Figure 10:
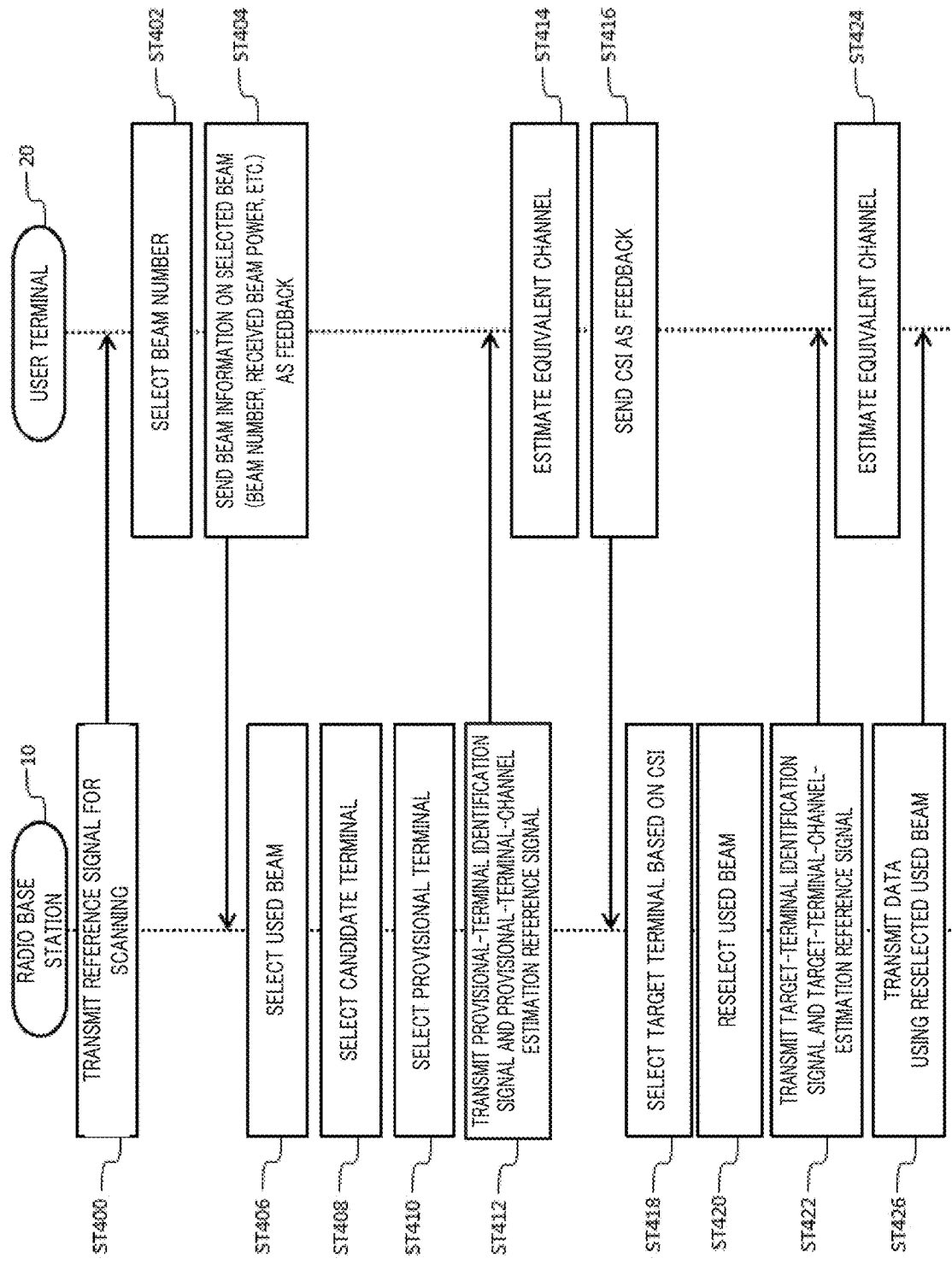
FIG. 10 is a sequence chart illustrating processing to reselect used beams after the target terminals are selected based on the CSI according to the embodiment of the present invention.
Figure 11:
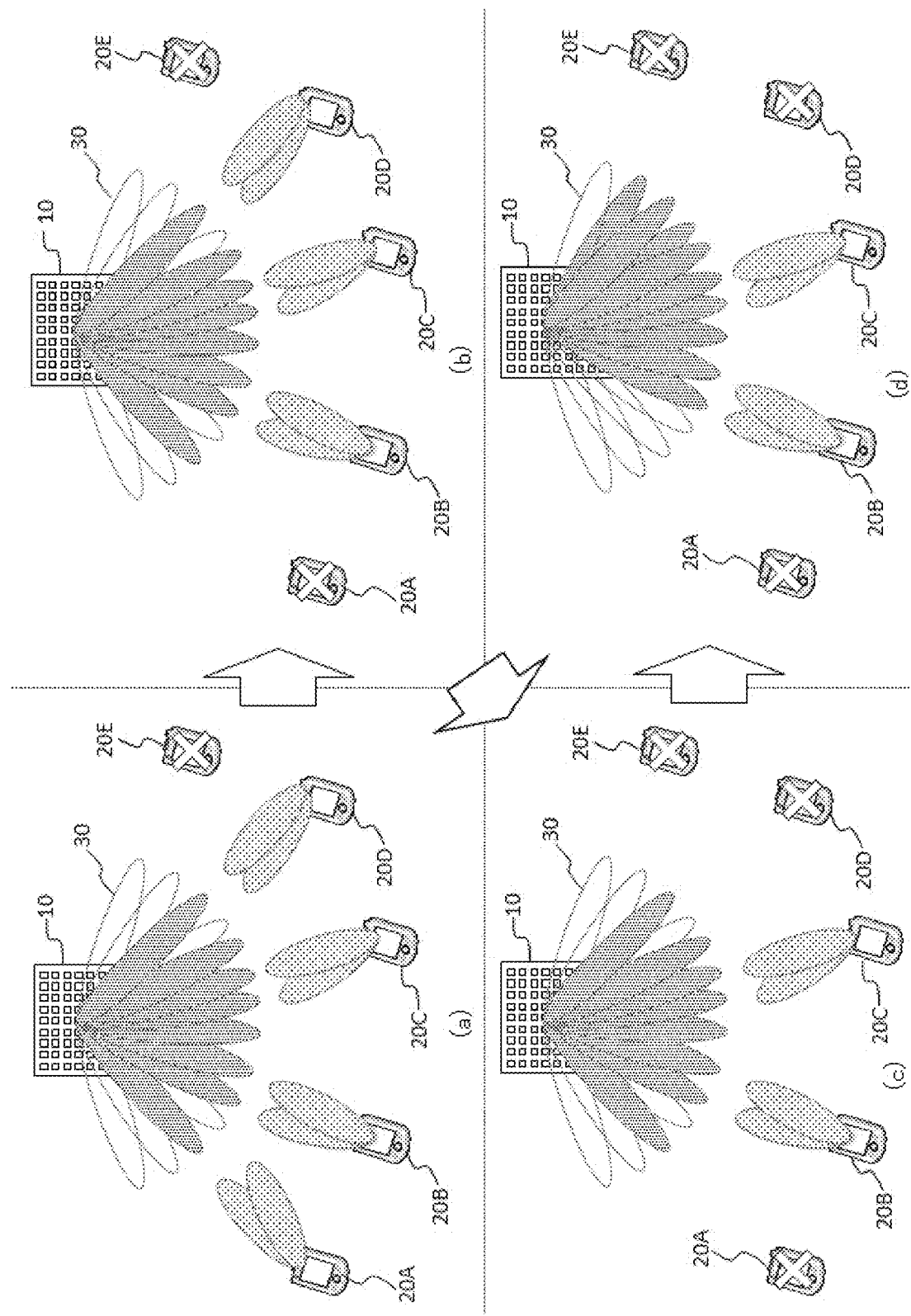
FIG. 11 schematically illustrates operation to reselect the used beams after the target terminals are selected according to the embodiment of the present invention based on the CSI.

FIG. 10 is a sequence chart illustrating processing to reselect beams after target terminals are selected based on CSI. FIG. 11 schematically illustrates an operation in a radio communication system during the processing illustrated in FIG. 10.

Base station 10 and terminals 20 perform, in ST400 to ST418, the same processing as in above ST300 to ST318 in FIG. 8.

Next, beam selecting section 100 of base station 10 reselects used beams in the same manner as in above ST212 in FIG. 6 in consideration only of the target terminals selected based on the CSI in ST418 (ST420). FIG. 11 illustrates, at (c), the used beams before reselection, and FIG. 11 illustrates, at (d), the used beams after reselection in consideration only of target terminals 20B and 20C.

Next, base station 10 and the target terminals perform, in ST422 to ST426, the same processing as in above ST214 to ST218 in FIG. 6.

<Effect>

According to the aforementioned embodiment of the present invention, beams 30 to be used by base station 10 and terminals 20 for which spatial multiplexing is carried out can be appropriately selected in a radio communication system according to multiuser Massive MIMO. Accordingly, the system throughput that is the sum of the throughputs of all terminals 20 can be increased.

The embodiments of the present invention have been described above.

Note that, the aforementioned embodiments are described in relation to the case where the base station transmits the reference signals for the channel estimation. However, in the channel estimation, terminals may also transmit the reference signals for the channel estimation, or a channel estimation value (channel information) may also be obtained without the use of reference signals. That is, in the channel estimate, only the channel information indicating an equivalent channel matrix (HW) including BF weights needs to be obtained.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 12:
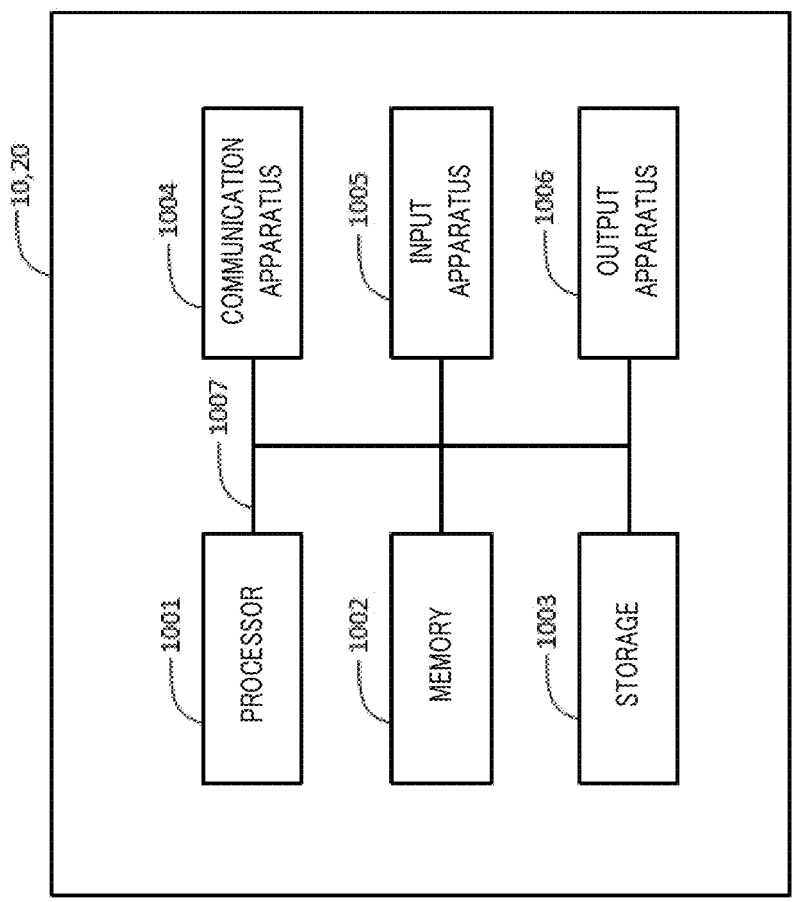
FIG. 12 illustrates an exemplary hardware configuration of a radio base station and a user terminal according to the present invention.

For example, the radio base station, the user terminal, and the like according to an embodiment of the present invention may function as a computer that executes processing of a radio communication method of the present invention. FIG. 12 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, above-mentioned beam selecting section 100, user terminal selecting section 102, digital precoder 104, D/A conversion sections 106, frequency conversion sections 108, fixed-analog-beamforming section 110, fixed-digital-beamforming section 112, or the like may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks constituting radio base station 10 and user terminal 20 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, antenna 114 or the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station", "eNB", "cell", and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval), or one mini slot may be called a TTI.

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-29375 filed on Feb. 20, 2017, and the entire content of Japanese Patent Application No. 2017-29375 is hereby incorporated by reference.

INDUSTRIAL APPLICABILITY

An aspect of the present invention is useful for a mobile communication system.

REFERENCE SIGNS LIST

10 Radio Base Station
20 User Terminal
30 Beam
100 Beam Selecting Section
102 User Terminal Selecting Section
104 Digital Precoder
108 Frequency Conversion Section
110 Fixed-analog-beamforming Section
112 Fixed-digital-beamforming Section
114 Antenna

The invention claimed is:

1. A radio base station configured to perform MIMO transmission with user terminals, the radio base station comprising:
   a beam selecting section configured to compute beam-selection reference parameters based on beam information transmitted by the user terminals, the beam selecting section being configured to select at least one used beam from among a plurality of beams based on the beam-selection reference parameters; and
   a user terminal selecting section configured to select, from among at least one of the user terminals which has selected the at least one used beam, at least one of the user terminals to be a target for the at least one used beam,
   wherein the beam selecting section is further configured to compute the beam-selection reference parameters based on past throughput information collectively transmitted by the user terminals and a proportional fairness criterion.

2. The radio base station according to claim 1, wherein the beam information includes received power of each beam received by the user terminals, and
   the beam-selection reference parameters are design parameters to be computed based on the beam information transmitted by the user terminals.

3. The radio base station according to claim 2, wherein, after the at least one user terminal to be a target for the at least one used beam is selected by the user terminal selecting section, the beam selecting section reselects a used beam from among the plurality of beams based on a beam-selection reference parameter to be computed based on beam information on a beam to be selected by the selected at least one user terminal.

4. The radio base station according to claim 1, wherein the user terminal selecting section computes user-terminal-selection reference parameters based on the beam information transmitted by the at least one user terminal which has selected the at least one used beam, and
   the user terminal selecting section selects, based on the user-terminal-selection reference parameters, the at least one user terminal to be a target for the at least one used beam.

5. The radio base station according to claim 4, wherein the beam information includes received power of each beam received by the user terminals, and
   the user-terminal-selection reference parameters are design parameters to be computed based on the beam information transmitted by the at least one user terminal which has selected the at least one used beam.

6. The radio base station according to claim 5, wherein, after the at least one user terminal to be a target for the at least one used beam is selected by the user terminal selecting section, the beam selecting section reselects a used beam from among the plurality of beams based on a beam-selection reference parameter to be computed based on beam information on a beam to be selected by the selected at least one user terminal.

7. The radio base station according to claim 4, wherein the user terminal selecting section:
   selects a provisional user terminal based on the user-terminal-selection reference parameters; and
   selects the at least one user terminal to be a target for the at least one used beam, based on channel information of the selected provisional user terminal.

8. The radio base station according to claim 7, wherein, after the at least one user terminal to be a target for the at least one used beam is selected by the user terminal selecting section, the beam selecting section reselects a used beam from among the plurality of beams based on a beam-selection reference parameter to be computed based on beam information on a beam to be selected by the selected at least one user terminal.

9. The radio base station according to claim 4, wherein, after the at least one user terminal to be a target for the at least one used beam is selected by the user terminal selecting section, the beam selecting section reselects a used beam from among the plurality of beams based on a beam-selection reference parameter to be computed based on beam information on a beam to be selected by the selected at least one user terminal.

10. The radio base station according to claim 1, wherein, after the at least one user terminal to be a target for the at least one used beam is selected by the user terminal selecting section, the beam selecting section reselects a used beam from among the plurality of beams based on a beam-selection reference parameter to be computed based on beam information on a beam to be selected by the selected at least one user terminal.

11. A radio communication method for a radio base station configured to perform MIMO transmission with user terminals, the radio communication method comprising:

computing beam-selection reference parameters based on beam information transmitted by the user terminals, and selecting at least one used beam from among a plurality of beams based on the beam-selection reference parameters; and selecting, from among at least one of the user terminals which has selected the at least one used beam, at least one of the user terminals to be a target for the at least one used beam, wherein the radio base station is further configured to compute the beam-selection reference parameters based on past throughput information collectively transmitted by the user terminals and a proportional fairness criterion.

* * * * *